(12) United States Patent
Kajiwara et al.

(10) Patent No.: US 8,218,307 B2
(45) Date of Patent: Jul. 10, 2012

(54) INFORMATION TERMINAL DEVICE

(75) Inventors: Yoshifumi Kajiwara, Kawasaki (JP);
Manabu Matsushima, Kawasaki (JP);
Kenta Sugimori, Kawasaki (JP);
Haruyoshi Yada, Kawasaki (JP);
Hiroshi Kubo, Kawasaki (JP); Hiroyuki Takita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 328 days.

(21) Appl. No.: 12/723,016

(22) Filed: Mar. 12, 2010

(65) Prior Publication Data
US 2010/0246108 A1 Sep. 30, 2010

(30) Foreign Application Priority Data
Mar. 30, 2009 (JP) ................................ 2009-083761

(51) Int. Cl.
*G06F 1/16* (2006.01)
(52) U.S. Cl. ........... 361/679.3; 361/679.55; 361/679.56; 455/575.1; 455/575.4
(58) Field of Classification Search ............... 361/679.3
See application file for complete search history.

(56) References Cited

U.S. PATENT DOCUMENTS

| 5,202,817 | A * | 4/1993 | Koenck et al. ........... 361/679.09 |
| 7,496,389 | B2 * | 2/2009 | Cho et al. .................... 455/575.4 |
| 7,761,123 | B2 * | 7/2010 | Hyun et al. ................. 455/575.1 |
| 2005/0266898 | A1 * | 12/2005 | Ahn et al. .................. 455/575.1 |
| 2005/0272488 | A1 * | 12/2005 | Zou .............................. 455/575.4 |
| 2007/0072659 | A1 * | 3/2007 | Ryu ............................. 455/575.3 |
| 2008/0096619 | A1 | 4/2008 | Kuga et al. |
| 2009/0036179 | A1 * | 2/2009 | Chiou et al. ................ 455/575.4 |
| 2011/0143818 | A1 * | 6/2011 | Makino et al. ................ 455/566 |

FOREIGN PATENT DOCUMENTS
JP 2008-103989 A 5/2008
* cited by examiner

*Primary Examiner* — Anthony Q Edwards
(74) *Attorney, Agent, or Firm* — Westerman, Hattori, Daniels & Adrian, LLP

(57) ABSTRACT

An information terminal device includes a first case including an operation section, and a second case movably connected to the first case with a connection mechanism, wherein an edge portion is formed around the operation section of the first case, the edge portion being raised toward the second case, and wherein an elastic sheet member is attached to a surface of the second case, the surface facing the first case, and the elastic sheet member includes a protruding portion, the protruding portion protruding toward the first case and having an outer side surface that elastically and slidably contacts an inner side surface of the edge portion.

4 Claims, 6 Drawing Sheets

CLOSED STATE

OPEN STATE

ROTATED STATE

INFORMATION TERMINAL DEVICE

CROSS-REFERENCE TO RELATED APPLICATIONS

This application is based upon and claims the benefit of priority of the prior Japanese Patent Application No. 2009-083761, filed on Mar. 30, 2009, the entire contents of which are incorporated herein by reference.

FIELD

The present invention relates to, for example, an information terminal device. In particular, the present invention relates to an information terminal device in which excessive play between cases in lateral directions is suppressed.

BACKGROUND

Some mobile phones and information terminal devices in widespread use today include a fixed-side case having an operation section such as keys and a movable-side case having a display section such as a display panel. The movable-side case is movably connected to the fixed-side case with a connection mechanism. For example, in a slide-type mobile phone, the movable-side case can be slid relative to the fixed-side case, so that the state of the mobile phone can be changed between a closed state in which the cases overlap each other and an open state in which the cases partially overlap each other.

In this type of information terminal device, there is a gap between the movable-side case and the fixed-side case so that the movable-side case can be smoothly moved relative to the fixed-side case. Therefore, the information terminal device has a problem in that there may be an excessive play between the cases when an external force is applied to the information terminal device in the closed state. In particular, there may be an excessive play between the cases in lateral directions when an external force is applied to the cases from a side of the cases.

In an information terminal device recently proposed, an edge portion is formed around an operation section on the fixed-side case so as to be protruded toward the movable-side case, and a protruding portion is formed on a surface of the movable-side case facing the fixed-side case so as to protrude toward the fixed-side case. When an external force is applied from a side of the information terminal device in the closed state, a side surface of the protruding portion of the movable-side case is pressed against a side surface of the edge portion of the fixed-side case so that excessive play between the cases in lateral directions can be suppressed.

[Patent Document 1] Japanese Laid-open Patent Publication No. 2008-103989

However, the existing information terminal device has a problem in that, in reality, excessive play between the cases in lateral directions is not sufficiently suppressed. That is, because both the fixed-side case and the movable-side case are made of a resin or the like having a surface hardness that is comparatively high, the edge portion of the fixed-side case and the protruding portion of the movable-side case may suffer from abrasion when the edge portion and the protruding portion repeatedly contact each other, which may lead to excessive play between the cases.

Moreover, when the cases are made of a resin or the like having a high surface hardness, shock resistance of the cases is low. Therefore, if a side surface of the edge portion is strongly pressed against a side surface of the protruding portion of the movable-side case when, for example, the information terminal device is dropped, the edge portion of the fixed-side case and the protruding portion of the movable-side case may be broken, which may lead to excessive play between the cases in lateral directions.

SUMMARY

According to an aspect of the invention, an information terminal device includes a first case including an operation section, and a second case movably connected to the first case with a connection mechanism, wherein an edge portion is formed around the operation section of the first case, the edge portion being raised toward the second case, and wherein an elastic sheet member is attached to a surface of the second case, the surface facing the first case, and the elastic sheet member includes a protruding portion, the protruding portion protruding toward the first case and having an outer side surface that elastically and slidably contacts an inner side surface of the edge portion.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

An embodiment of an information terminal device disclosed in the present application will be described in detail with reference to the drawings. In the embodiment, the information terminal device disclosed in the present application is applied to a rotatable-type mobile phone. The information terminal device disclosed in the present application may be applied to various types of mobile phones such as, for example, a slide-type mobile phone.

Figure 1:
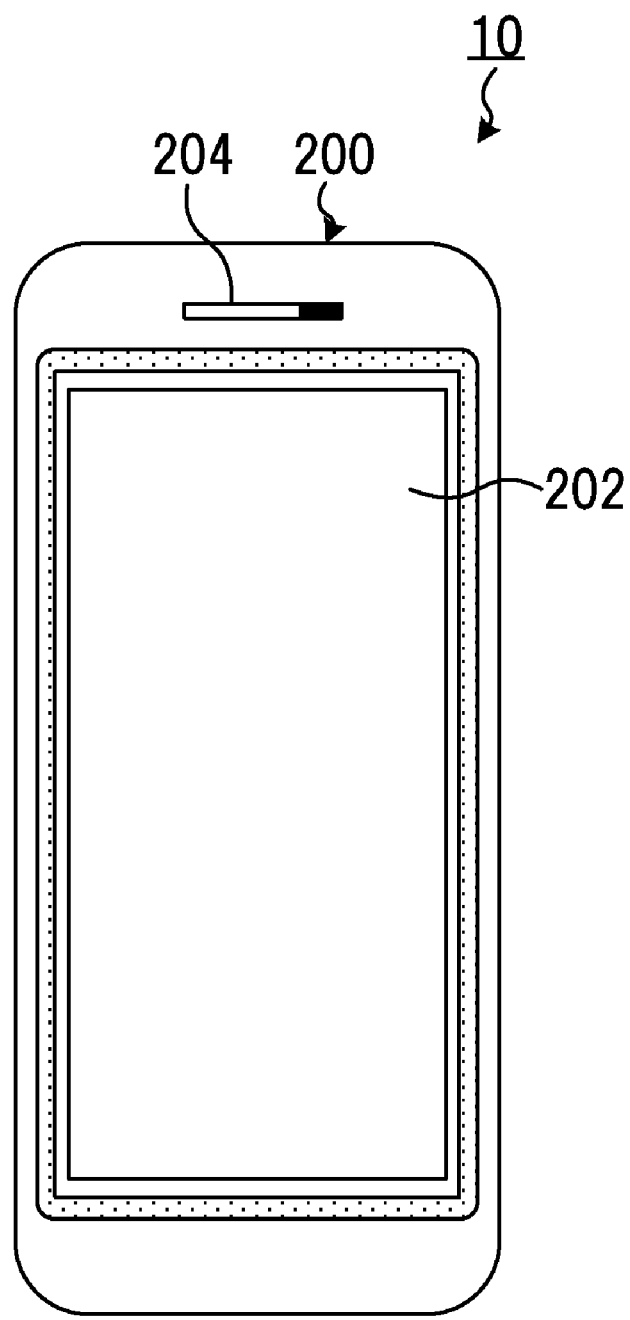
FIG. 1 is a plan view of a mobile phone according to an embodiment in a closed state.
Figure 2:
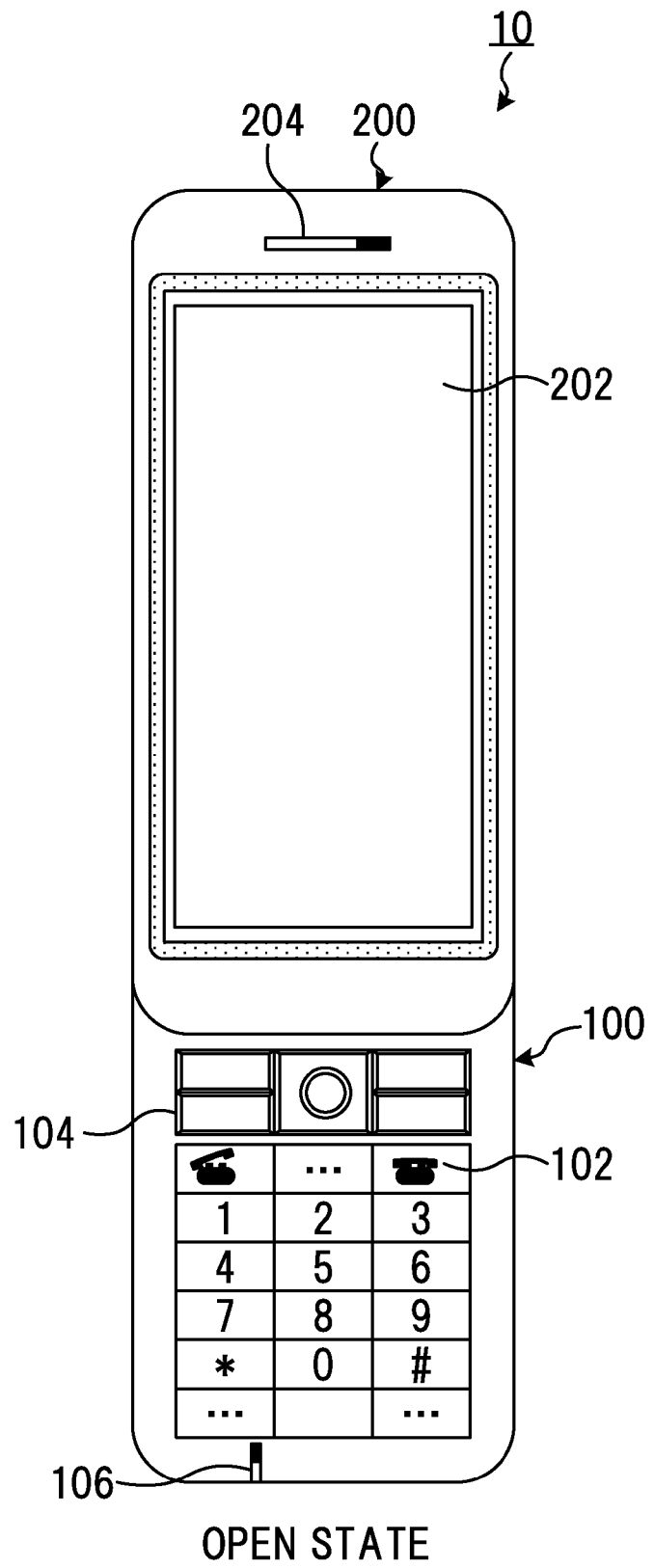
FIG. 2 is a plan view of the mobile phone according to the embodiment in an open state.
Figure 3:
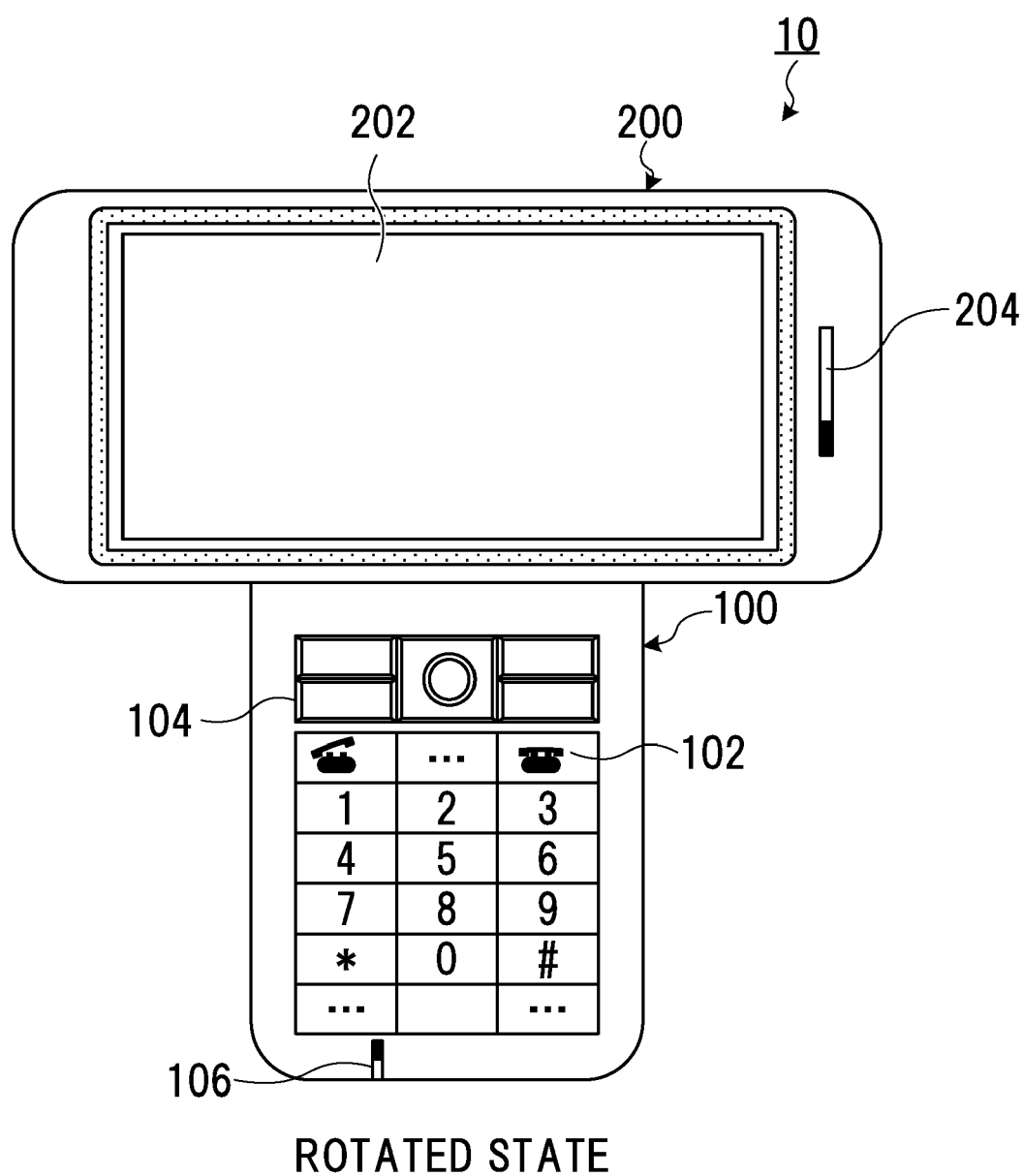
FIG. 3 is a plan view of the mobile phone according to the embodiment in a rotated state.

The structure of a mobile phone 10 according to the embodiment will be described. FIG. 1 is a plan view of the mobile phone 10 according to an embodiment in a closed state. FIG. 2 is a plan view of the mobile phone 10 according to the embodiment in an open state. FIG. 3 is a plan view of the mobile phone 10 according to the embodiment in a rotated state.

As illustrated in FIGS. 1 to 3, the mobile phone 10 includes a fixed-side case 100 that corresponds to a first case, and a movable-side case 200 that corresponds to a second case. The movable-side case 200 is connected to the fixed-side case 100 with a connection mechanism 300 (see FIG. 5) so that the movable-side case 200 may be moved relative to the fixed-side case 100. The state of the mobile phone 10 may be changed between a closed state illustrated in FIG. 1, an open state illustrated in FIG. 2, and a rotated state illustrated in FIG. 3 by sliding and rotating the movable-side case 200 relative to the fixed-side case 100.

The closed state illustrated in FIG. 1 is a state in which the movable-side case 200 and the fixed-side case 100 substantially overlap each other. In the closed state, the length of the mobile phone 10 in the longitudinal direction is the shortest. Therefore, the mobile phone 10 is set to be in the closed state when a user carries the mobile phone 10 or browses simple information, such as, for example, the calling records or information on the Internet.

The open state illustrated in FIG. 2 is a state in which the movable-side case 200 and the fixed-side case 100 overlap each other in an area smaller than that in the closed state. In the open state, the length of the mobile phone 10 in the longitudinal direction is longer than that in the closed state. In the open state, first operation buttons 102 and second operation buttons 104 on the fixed-side case 100 are exposed. The first operation buttons 102 and the second operation buttons 104 correspond to an operation section. Therefore, the mobile phone 10 is set to be in the open state when a user makes a phone call or writes an email message using the first and second operation buttons 102 and 104.

The rotated state illustrated in FIG. 3 is a state in which the movable-side case 200 has been rotated relative to the fixed-side case 100 by approximately 90° compared with the open state illustrated in FIG. 2. In the rotated state, a display screen 202 is in the landscape position. Therefore, the mobile phone is set to be in the rotated state when, for example, a user watches TV, browses information on the Internet, reads a received email message, or plays a game.

Figure 4:
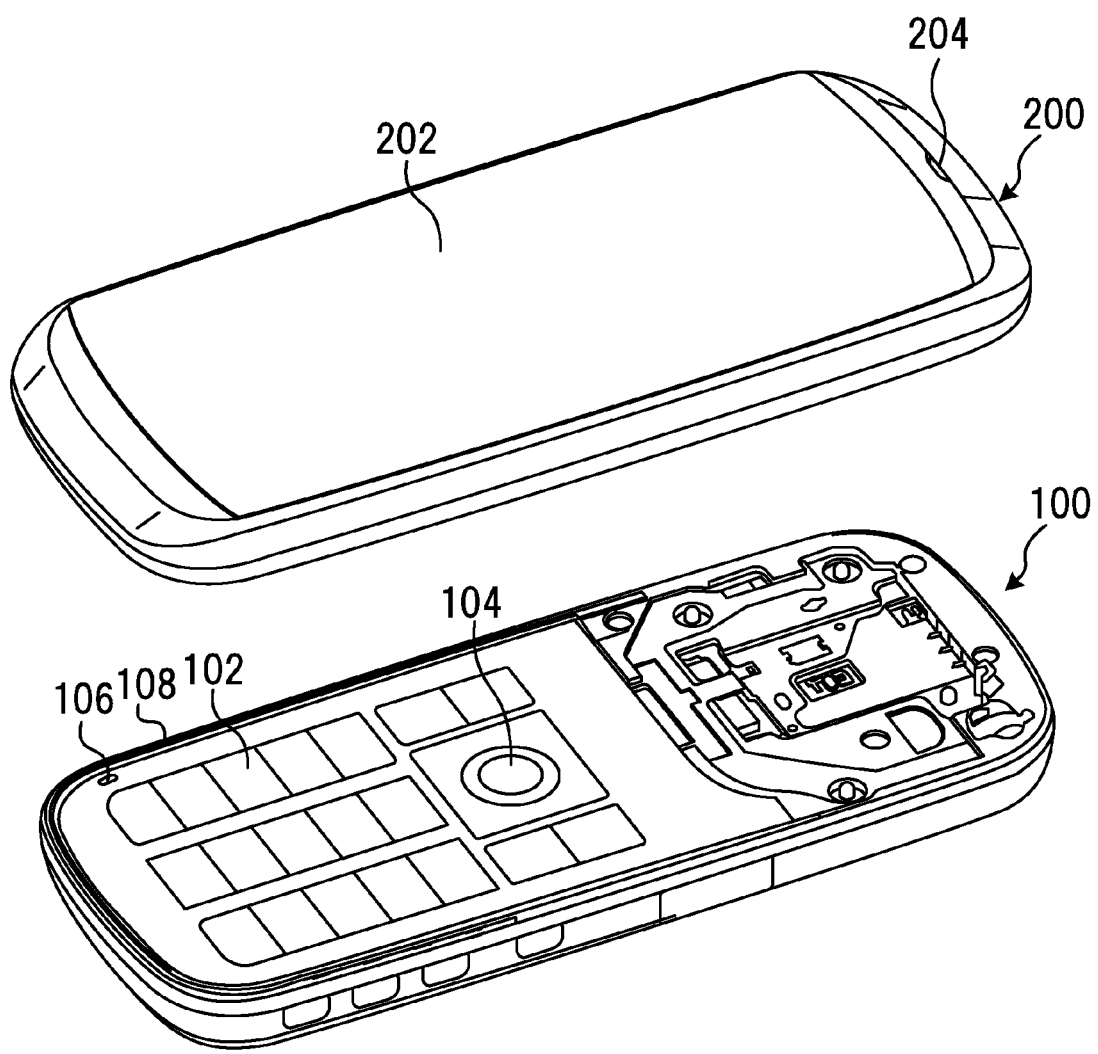
FIG. 4 is an exploded perspective view of the mobile phone in the closed state viewed from a movable-side case side.
Figure 5:
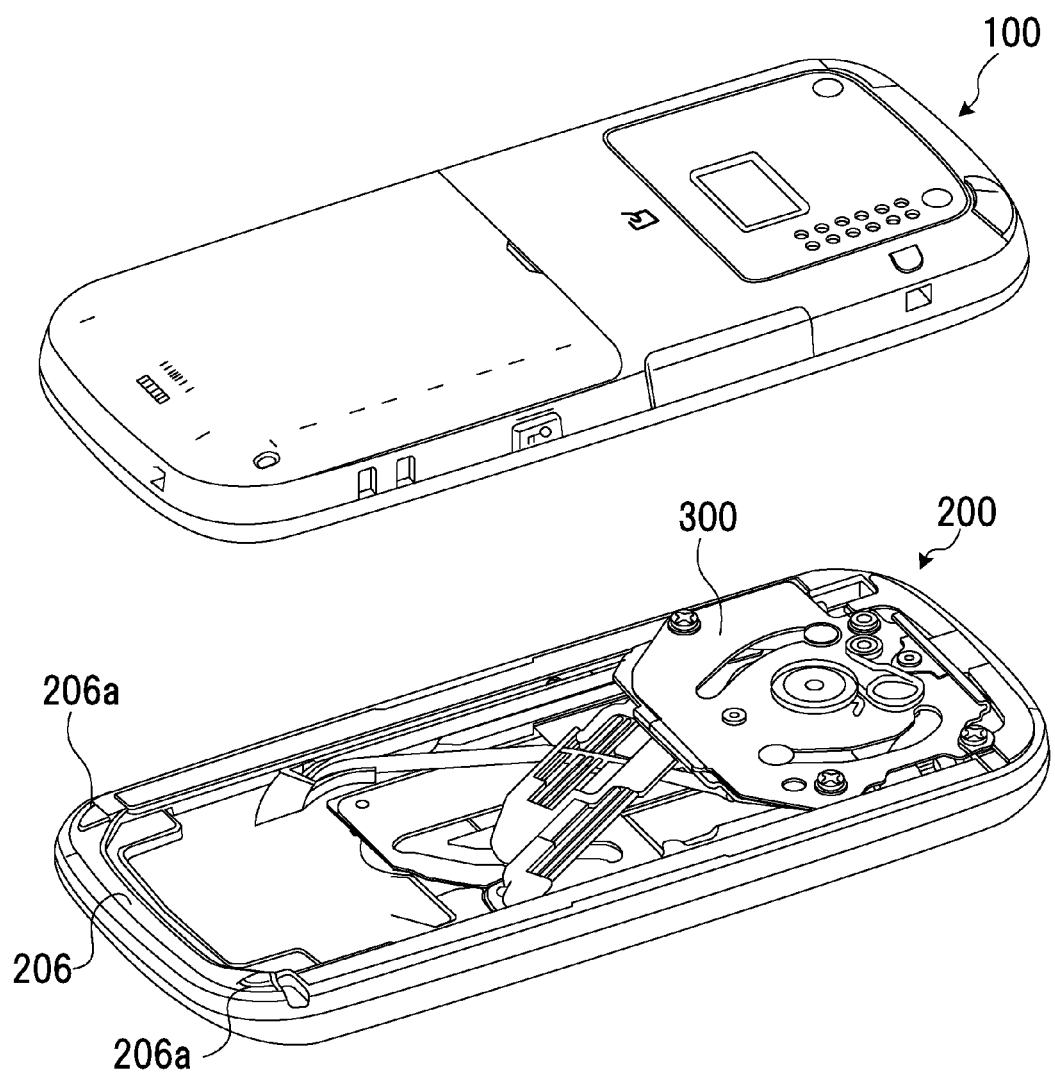
FIG. 5 is an exploded perspective view of the mobile phone in the closed state viewed from a fixed-side case side.

The specific structure of the mobile phone 10 will be described. FIG. 4 is an exploded perspective view of the mobile phone 10 in the closed state viewed from a movable-side case 200 side. FIG. 5 is an exploded perspective view of the mobile phone 10 in the closed state viewed from a fixed-side case 100 side.

In the embodiment, for convenience of description, the upward direction refers to the direction from the fixed-side case 100 to the movable-side case 200 in the closed state, and the downward direction refers to the direction from the movable-side case 200 to the fixed-side case 100 in the closed state. The forward direction refers to the direction in which the movable-side case 200 is moved in a sliding manner relative to the fixed-side case 100 when the state of the mobile phone 10 is changed from the closed state to the open state. The backward direction refers to the direction in which the movable-side case 200 is moved in a sliding manner relative to the fixed-side case 100 when the state of the mobile phone 10 is changed from the open state to the closed state.

As illustrated in FIGS. 1 to 5, the mobile phone 10 includes the fixed-side case 100 and the movable-side case 200. The first operation buttons 102 and the second operation buttons 104, which correspond to the operation section, are disposed on the fixed-side case 100. The display screen 202, which corresponds to a display section, is disposed on the movable-side case 200.

The fixed-side case 100, which has a substantially rectangular flat shape, is made of a resin or the like having a surface hardness that is comparatively high. The first operation buttons 102, the second operation buttons 104, and a mouthpiece 106 are disposed on an upper surface of the fixed-side case 100. The first operation buttons 102 include, for example, numeric keys, a call key, an end key, etc. The second operation buttons 104 include, for example, a direction key, a shortcut key, etc. The mouthpiece 106 includes a microphone disposed in the fixed-side case 100.

As with the fixed-side case 100, the movable-side case 200 is made of a resin or the like having a high surface hardness, and has a substantially rectangular flat shape. The display screen 202 and an earpiece 204 are disposed on an upper surface of the movable-side case 200. The display screen 202 is disposed at substantially the center of the upper surface of the movable-side case 200. The display screen includes a liquid crystal panel or an organic electroluminescent display. The display screen 202 may have a function of a touch panel so that a user may operate the mobile phone 10 using the display screen 202 even when the mobile phone 10 is in the closed state illustrated in FIG. 1.

As illustrated in FIG. 5, the connection mechanism 300 is disposed between the fixed-side case 100 and the movable-side case 200. The connection mechanism 300 allows the movable-side case 200 to be moved relative to the fixed-side case 100 in the forward and backward directions, and also allows the movable-side case 200 to be rotated relative to the fixed-side case 100 by 90°. Detailed description of the connection mechanism 300 is omitted because the connection mechanism 300 is not directly related to the main part of the mobile phone 10.

In the embodiment, an edge portion 108 is formed around the operation section on the fixed-side case 100. The edge portion 108 is raised toward the movable-side case 200. In the embodiment, an elastic sheet member 206 is attached to a surface of the movable-side case 200 facing the fixed-side case 100. The elastic sheet member 206 has protruding portions 206a that protrude toward the fixed-side case 100. Outer side surfaces of the protruding portions 206a elastically and slidably contact an inner side surface of the edge portion 108. The operation section includes, for example, the first operation buttons 102 and the second operation buttons 104.

With this structure, excessive play between the fixed-side case 100 and the movable-side case 200 in lateral directions may be suppressed over a long period of time.

Figure 6:
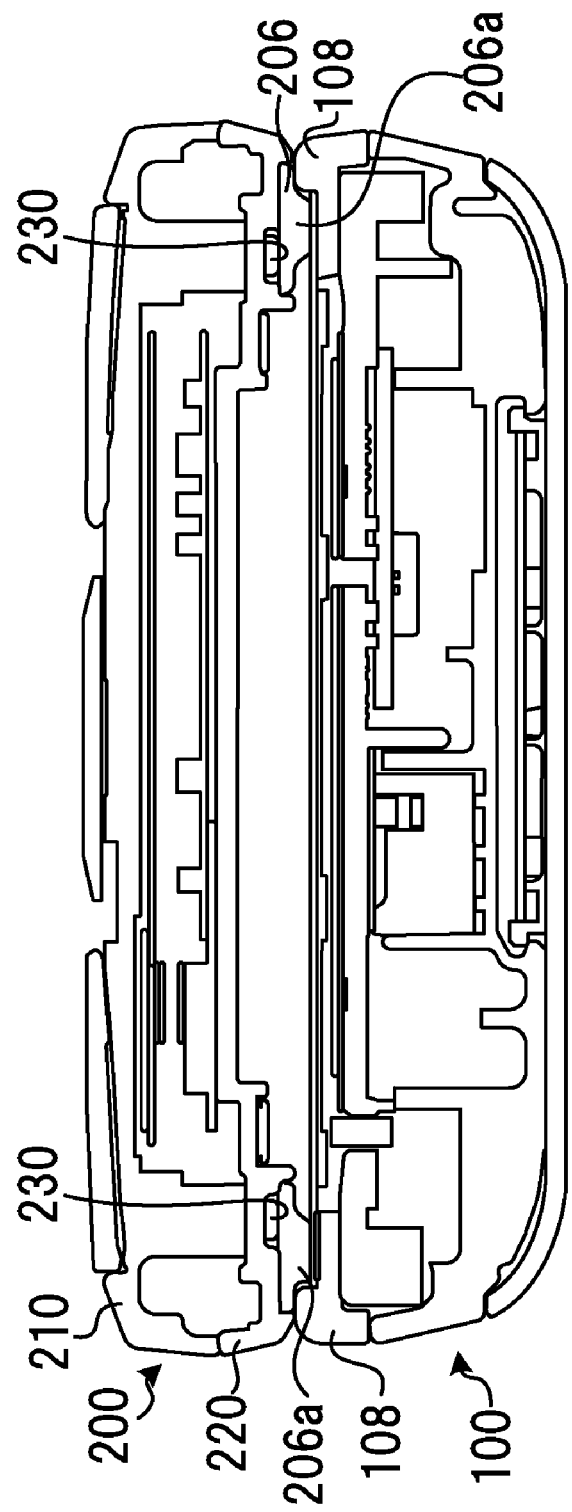
FIG. 6 is a cross-sectional view of a vicinity of a rear end portion of the movable-side case of the mobile phone according to the embodiment in the closed state.

FIG. 6 is a cross-sectional view of a vicinity of a rear end portion of the movable-side case 200 of the mobile phone 10 according to the embodiment in the closed state.

As illustrated in FIGS. 4 and 6, the edge portion 108 is formed around the operation section on the upper surface of the fixed-side case 100. The edge portion 108 is raised toward the movable-side case 200, and has a shape of a substantially U-shaped rail in a plan view. The edge portion 108 is formed around the operation section on the upper surface of the fixed-side case 100 in an area in which the edge portion 108 does not contact the protruding portions 206a when the movable-side case 200 is rotated relative to the fixed-side case 100. Therefore, the state of the mobile phone 10 may be smoothly changed from the open state illustrated in FIG. 2 to the rotated state illustrated in FIG. 3, because the protruding portions 206a are not caught on the edge portion 108.

The elastic sheet member 206 is made of, for example, an elastic polyurethane resin, and has a substantially flat plate shape. As illustrated in FIGS. 5 and 6, the elastic sheet member 206 is attached to the lower surface of the movable-side case 200 in the rear end portion of the movable-side case 200. At both ends on the lower surface of the elastic sheet member 206, the protruding portions 206a protrude toward the fixed-side case 100.

The outer side surfaces of the protruding portions 206a elastically and slidably contact the inner side surface of the edge portion 108 of the fixed-side case 100. When the mobile phone 10 is in the closed state illustrated in FIG. 1, the outer side surfaces of the protruding portions 206a elastically contact the inner side surface of the edge portion 108. While the state of the mobile phone 10 is being changed from the closed state illustrated in FIG. 1 to the open state illustrated in FIG. 2, the outer side surfaces of the protruding portions 206a slide on the inner side surface of the edge portion 108 while elastically contacting the inner side surface of the edge portion 108.

In the embodiment, if an external force is applied to the mobile phone 10 from a side of the mobile phone 10 when the mobile phone 10 is in the closed state or while the state of the mobile phone is being changed from the closed state to the open state, the protruding portions 206a elastically deform so that the external force, which is transmitted to the edge portion 108 of the fixed-side case 100, may be absorbed and dispersed. As a result, excessive play between the fixed-side case 100 and the movable-side case 200 in lateral directions may be effectively suppressed. Even if the protruding portions 206a and the edge portion 108 repeatedly contact each other, abrasion of the edge portion 108 may be suppressed owing to the elastic deformation of the protruding portions 206a. Even if the outer side surfaces of the protruding portions 206a are strongly pressed against the inner side surface of the edge portion 108 when, for example, the mobile phone 10 is dropped, the impact may be absorbed owing to the elastic deformation of the protruding portions 206a, whereby breakage of the edge portion 108 may be reduced if not prevented. As a result, excessive play between the fixed-side case 100 and the movable-side case 200 in lateral directions may be suppressed for a long period of time.

The outer side surfaces of the protruding portions 206a, which slidably contact the inner side surface of the edge portion 108, have an upright-wall-like shape that corresponds to the upright-wall-like shape of the inner side surface of the edge portion 108. The inner side surfaces of the protruding portions 206a are inclined surfaces that extend toward the fixed-side case 100. In the mobile phone according to the embodiment, the outer side surfaces of the protruding portions 206a have a shape that corresponds to the shape of the inner side surface of the edge portion 108. Therefore, the protruding portions 206a may smoothly slide on the edge portion 108, whereby abrasion of the edge portion 108 may be further suppressed. In the embodiment, the inner side surfaces of the protruding portions 206a are inclined surfaces that extend toward the fixed-side case 100. Therefore, while the state of the mobile phone 10 is being changed from the open state illustrated in FIG. 2 to the rotated state illustrated in FIG. 3, the protruding portions 206a are not caught on the operation section or the like disposed on the upper surface of the fixed-side case 100.

As illustrated in FIG. 6, the movable-side case 200 has a two-part structure including a movable-side front case 210, on which the display screen 202 is disposed, and a movable-side rear case 220, which is disposed on the lower surface side of the movable-side front case 210. Screws 230 are disposed in the rear end portion of the movable-side case 200. The screws 230 join the movable-side front case 210 and the movable-side rear case 220 to each other. In the embodiment, the elastic sheet member 206 is attached to the lower surface of the movable-side case 200 in the rear end portion of the movable-side case 200 so as to cover the screws 230. Thus, the elastic sheet member 206 not only suppresses excessive play between the fixed-side case 100 and the movable-side case 200 in lateral directions, but also covers the screws 230 so that the screws 230 may not be seen from the outside. Therefore, it is not necessary to prepare an additional member for covering the screws 230, whereby the number of components may be reduced.

In the mobile phone 10 according to the embodiment, the edge portion 108 that is raised toward the movable-side case 200 is formed around the operation section on the fixed-side case 100. Moreover, the elastic sheet member 206 is attached to the surface of the movable-side case 200 facing the fixed-side case 100, and the elastic sheet member 206 includes the protruding portions 206a that protrude toward the fixed-side case 100 and have the outer side surfaces that elastically and slidably contact the inner side surface of the edge portion 108. Therefore, excessive play between the cases in lateral directions may be suppressed for a long period of time.

The invention is not limited to the above-described embodiment, and may be applied to various embodiments within the sprit and scope of the invention described in the claims.

In the above-described embodiment, the information terminal device is applied to a mobile phone. However, the invention is not limited thereto. For example, the information terminal device of the embodiment may be applied to small information processing devices such as personal digital assistants (PDAs), small music players, portable TV sets, portable game machines, and other information terminal devices.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

What is claimed is:

1. An information terminal device comprising:
   a first case including an operation section; and
   a second case movably connected to the first case with a connection mechanism,
   wherein an edge portion is formed around the operation section of the first case, the edge portion being raised toward the second case, and
   wherein an elastic sheet member is attached to a surface of the second case, the surface facing the first case, and the elastic sheet member includes a protruding portion, the protruding portion protruding toward the first case and having an outer side surface that elastically and slidably contacts an inner side surface of the edge portion.

2. The information terminal device according to claim 1, wherein the edge portion is formed around the operation section of the first case in an area in which the edge portion does not contact the protruding portion when the second case is rotated relative to the first case.

3. The information terminal device according to claim 1, wherein the outer side surface of the protruding portion has a shape corresponding to a shape of the inner side surface of the edge portion, and the inner side surface of the protruding portion is an inclined surface that extends toward the first case.

4. The information terminal device according to claim 1, wherein the second case includes a front case and a rear case, and a fastening member is disposed in the surface of the second case facing the first case, the fastening member joining the front case and the rear case to each other, and
   wherein the elastic sheet member is attached to the surface of the second case facing the first case so as to cover the fastening member.

* * * * *